(12) United States Patent
Park et al.

(10) Patent No.: US 12,378,137 B2
(45) Date of Patent: Aug. 5, 2025

(54) AMMONIA STRIPPING DEVICE, AND RESOURCE RECOVERY TYPE HIGH CONCENTRATION WASTEWATER TREATMENT SYSTEM USING THE SAME

(71) Applicant: KOREA CONFORMITY LABORATORIES, Seoul (KR)

(72) Inventors: Cheol Park, Gwangju (KR); Jun Min Park, Seoul (KR)

(73) Assignee: KOREA CONFORMITY LABORATORIES, Seoul (KR)

( * ) Notice: Subject to any disclaimer, the term of this patent is extended or adjusted under 35 U.S.C. 154(b) by 0 days.

(21) Appl. No.: 18/443,363

(22) Filed: Feb. 16, 2024

(65) Prior Publication Data
US 2025/0197249 A1 Jun. 19, 2025

(30) Foreign Application Priority Data

Dec. 19, 2023 (KR) .................. 10-2023-0186032

(51) Int. Cl.
*C02F 1/20* (2023.01)
*B01D 53/22* (2006.01)
(Continued)

(52) U.S. Cl.
CPC .............. *C02F 1/20* (2013.01); *B01D 53/229* (2013.01); *B01D 53/30* (2013.01); *B01D 69/08* (2013.01);
(Continued)

(58) Field of Classification Search
CPC .... B01D 71/641; B01D 53/229; B01D 53/30; B01D 69/08; B01D 2257/406; C02F 1/20;
(Continued)

(56) References Cited

U.S. PATENT DOCUMENTS

| 10,752,533 B2 | 8/2020 | Yang et al. |
| 2014/0033776 A1 | 2/2014 | Josse et al. |
| 2014/0346108 A1 | 11/2014 | Josse et al. |

FOREIGN PATENT DOCUMENTS

| JP | 06182327 A | 7/1994 | |
| JP | H-06182327 A * | 7/1994 | ......... B01D 19/0021 |

(Continued)

OTHER PUBLICATIONS

Steam Control and Condensate Drainage for Heat Exchangers, ITT Industries (Year: 1998).*
(Continued)

*Primary Examiner* — In Suk C Bullock
*Assistant Examiner* — Fidan Bersin
(74) *Attorney, Agent, or Firm* — NKL LAW; Jae Youn Kim

(57) ABSTRACT

An ammonia stripping device, and a resource recovery type high concentration wastewater treatment system using the ammonia stripping device are disclosed. The ammonia stripping device optimizes the conditions of pH, temperature, and pressure within a decompression type reactor with respect to raw water. Stripped ammonia is to be highly purified in a gas phase without phase change by a separation membrane process of causing the stripped ammonia to pass through a gas separation membrane, and selectively recovering the recovered ammonia. The recovered ammonia of high purity can be made into resources such as production of urea solutions, power generation by raw materials of green hydrogen and mixed fuel, and so on.

4 Claims, 6 Drawing Sheets

(51) Int. Cl.
    *B01D 53/30*      (2006.01)
    *B01D 69/08*      (2006.01)
    *B01D 71/64*      (2006.01)
    *C01C 1/12*      (2006.01)
    *C02F 1/36*      (2023.01)
    *C02F 101/16*      (2006.01)

(52) U.S. Cl.
    CPC .............. *B01D 71/641* (2022.08); *C01C 1/12* (2013.01); *C02F 1/36* (2013.01); *B01D 2257/406* (2013.01); *C02F 2101/16* (2013.01); *C02F 2209/03* (2013.01)

(58) Field of Classification Search
    CPC .... C02F 1/36; C02F 2101/16; C02F 2209/03; C01C 1/12
    See application file for complete search history.

(56) References Cited

FOREIGN PATENT DOCUMENTS

| KR | 20090109956 | A | | 10/2009 |
|---|---|---|---|---|
| KR | 10-2011-0071236 | A | | 6/2011 |
| KR | 10-1804011 | B1 | | 9/2016 |
| KR | 10-2016-0117838 | A | | 10/2016 |
| KR | 10-1785505 | B1 | | 10/2016 |
| TW | M-526569 | U | * | 8/2016 |

OTHER PUBLICATIONS

JP-06182327-A, machine translated doc (Year: 1994).*
TW-526569-U, machine translated doc (Year: 2016).*
KR20090109956-A, Lee Uk Jae, foreign and translated doc (Year: 2009).*
KR20110071236-A, Choi Kye Seol, foreign and translated doc (Year: 2011).*
Impact of Sidestream Pre-Treatment on Ammonia recovery by Membrane Contractors: Experimental and Economic Evaluation, Vinardell (Year: 2022).*
Performance of Sponge and Finger-like Structures of PSF/PET Membranes in Hydrogen Separation Industry, Yousef (Year: 2023).*
Thermally Stable Polymers for Advanced High-Performance Gas Separation Membranes, Rezakazemi (Year: 2018).*
A Highly Efficient Hybrid Technique—a Membrane Assisted Gas Adsorption for Ammonia Recovery After the Haber-Bosch Process, Petukhov (Year: 2021).*
An Efficient Technique for Ammonia Capture in the Haber-Process Loop—membrane-assisted Gas Adsorption, Atlasksin (Year: 2022).*
Membrane Separation and Filtration Applications, Equilibar (Year: 2013).*
Guide to Gas Testing: Samples, Methods, and Standards, Keskiväli (Year: 2022).*
KR-101200156-B1, Chung, foreign and translated doc (Year: 2012).*
Luqmani, B., et al. Transitioning through the vapour-liquid equilibrium for low energy thermal stripping of ammonia from wastewater: Enabling transformation of NH3 into a zero-carbon fuel. Water Research. vol. 248, Jan. 1, 2024, 120856.

* cited by examiner

AMMONIA STRIPPING DEVICE, AND RESOURCE RECOVERY TYPE HIGH CONCENTRATION WASTEWATER TREATMENT SYSTEM USING THE SAME

CROSS-REFERENCE TO RELATED APPLICATION

This application claims priority to Korean Patent Application No. 10-2023-0186032, filed on Dec. 19, 2023 in the Korean Intellectual Property Office, the entire contents of which are hereby incorporated by reference.

BACKGROUND OF THE INVENTION

Field of the Invention

The present invention relates to an ammonia stripping device, and a resource recovery type high concentration wastewater treatment system using the ammonia stripping device, and more specifically to an ammonia stripping device and a resource recovery type high concentration wastewater treatment system which, by an ammonia stripping process of optimizing conditions of pH, temperature, and pressure within a decompression type reactor with respect to raw water resulting from gathering high concentration wastewater and removing a solid therefrom, and removing ammonia with high efficiency by performing vacuum stripping, or a combination of vacuum and ultrasonic stripping, a process of causing an ammonia mixed gas recovered by the stripping process is selectively and highly purified to the ammonia gas phase without phase change through a separation membrane process passing through a polymeric gas separation membrane, and the recovered highly purified ammonia is resourced.

Description of the Related Arts

As the number of livestock bred in farms has increased, an amount of the occurrence of livestock night soils has been increasing continuously, and most of the livestock night soils have been made into resources, such as compost or liquid manure and have been returned to farm land.

However, although it is expected that the amount of the occurrence of livestock night soils will increase in the future, since it is expected that cultivated acreage required for consumption of the compost and liquid manure made into resources will decrease continuously, it has been pointed out that there has been difficulty in securing markets for the compost or liquid manure.

Accordingly, there are limits to reusing compost and liquid manure in resources, there is a necessity to prepare an alternative idea for making them into resources, and specifically, in addition to making the compost and liquid manure into resources, it is required to realize a substitute for fertilizer resources by making biogas into energy, solid fuel, and so on.

Accordingly, it is required to establish bioenergy, high technique for the treatment of wastewater caused by stockbreeding, and strategies for recovering high value-added resources over simple barnyard manure based on the fact that hog farms are getting larger in size.

With respect to recycling of livestock night soils as resources, in case of Chinese companies, swine manure occurring from farms has completely been converted and utilized into biogas and has been reused in power generation and heat sources, and the companies have been carrying out the zero discharge of wastewater, minimization of the occurrence of bad smell, and in particular, the realization of carbon neutrality in a goal by 2050.

Although the realization of carbon neutrality is a very challenging goal, higher goals than this may be required by international society, and to realize the reduction of greenhouse gas emissions through innovation under environmental restrictions strengthened, it has been emphasized to make an investment capable of supporting the development and early commercialization of prospective energy technologies. At this time, to accelerate the reduction of greenhouse gas emissions, ammonia may be regarded as hydrogen energy in a sense, and there is a difference in the light of the fact that produced hydrogen is transferred and utilized into the form of ammonia. If hydrogen economics are introduced all over the world, markets for the production, transfer, and utilization of ammonia as a hydrogen carrier will increase, so the ammonia industry will grow with the hydrogen industry.

With respect to a current process of recovering nitrogen from wastewater and wastes having the high concentration of nitrogen, a stripping process of recovering ammonia extracted using a sulfuric acid solution after extracting an ammonium ion contained in wastewater in the form of gas has been utilized most actively.

In general, the stripping process recovers an ammonia gas by air-blowing in a stripping column after raising a pH up to about 9.5 to 11.5 because the rate of a form of the ammonia gas is high in order to increase a recovery rate of the ammonia gas, and finally recovers ammonia by injecting the recovered ammonia gas into an absorption column in which a sulfuric acid solution exists, thereby combining sulfuric acid and the ammonia gas with each other so as to be converted into ammonium sulfate ($(NH_4)_2SO_4$). At this time, nitrogen contained in the wastewater flowing in through the stripping process exists in the form of an ammonia gas ($NH_3$) and an ammonium ion ($NH_4^+$), and it is characteristic in that an occupation rate of two these materials become different according to each pH of the wastewater. Specifically, under the condition that pHs are higher than 9.25, the specific gravity of $NH_3$ increases, under the condition that pHs are lower than 9.25, the specific gravity of $NH_4^+$ increases, and as the pHs of the inflowing water become high gradually, the efficiency of removal increases, but due to the addition of chemicals, expenses for an operation, and an amount of the chemicals required for a process of treating a solution remaining behind stripping increase.

Also, since the stripping process is characteristic in that when it is carried out, the solubility of ammonia gas decreases at a high temperature, in order to enhance efficiency of the removal of ammonia existing within the water flowing in, stripping is applied under the condition of a high temperature of 70° C. or more, but it is problematic in that the high temperature for treatment increases a necessary amount of energy, and at the same time as this, an amount of the addition of alkali chemicals for maintaining pH during the treatment increases because a decomposition speed of organic matter accelerates, and thus a sharp decrease in pH scale occurs.

To date, although a process for recovering nitrogen based on stripping technologies has been used domestically and abroad, there have been difficulties in commercializing it due to the high cost of chemicals, the high cost of recovering nitrogen, and the occurrence of a low-quality final by-product.

As a part of settlement of this problem, Patent Document 1 discloses that a carbon dioxide stripping tower increases the efficiency of carbon dioxide stripping by increasing an insolubilization level of gas at a high temperature (45° C.), and reduces an amount used of a pH-regulating agent from an outlet by increasing pH up to a range of 8.5 to 9.0, thereby removing alkalinity, a pH regulation tank improves the efficiency of ammonia stripping by maintaining pH to be more than 10, and the stripping tower carries out stripping of an ammonia ion in the state of ammonia gas, and an absorption tower absorbs the ammonia gas in the state of a pH of less than 5, and then injects phosphoric acid ($H_3PO_4$), so valuable resources are recovered in the form of liquid manure (($NH_4)_2H_2PO_4$).

However, in order to reduce the cost of chemicals, the efficiency of nitrogen removal was greatly reduced even though the incoming water had a pH of less than 10. To overcome this problem, the carbon dioxide stripping process was used, but it was problematic in that not only was ammonia lost during the stripping process, but also a large amount of unpleasant odors were emitted.

Patent Document 2 discloses, as an invention relating to a system of removing or recovering high concentration nitrogen and phosphorous using ammonia stripping, a device capable of recovering or removing high concentration nitrogen and phosphorus contained in wastewater by linking an ammonia stripping tank, a biological water treatment part, an ammonia gas recovery process, a phosphorous recovery process together.

It shows a process of recovering an ammonia gas by adsorbing and/or desorbing ammonia using an absorbent after effectively carrying out stripping with respect to the ammonia gas from high concentration ammoniacal nitrogen contained in anaerobic digester effluent or wastewater using the ammonia stripping and biological water treatment part.

However, in order for the invention to recover ammonia, since the absorbent is developed and is applied to a thermal pressure change absorption system, it is expected that the consumption of energy will large compared with that shown in a separation membrane process, and ammonia obtained by the relevant process has the form of ammonia gas or ammonia water of low concentration.

Also, Patent Document 3 relates to a membrane distillation system capable of recovering valuable resources and discloses a technology of removing nitrogen and phosphorous using livestock night soil-based anaerobic digestion effluent which is wastewater containing high concentration nitrogen and phosphorous, at the same time as this, recovering valuable resources (fertilizer) therefrom, and producing treatment water available as agricultural water, using a membrane distillation (MD) process, from the wastewater from which the nitrogen and phosphorous are removed.

However, since the invention was carried out with the object of using wastewater in agricultural water by removing the nitrogen and phosphorous, no detailed research about recovery of the nitrogen was carried out, and in the relevant process, the ammonia was obtained in the form of ammonia water through the adsorption method, and no method of recovering the ammonia in high purity was carried out.

In case of the conventional ammonia recovery technologies as described above, in order to apply the stripping process, high pH, and a high temperature of about 50° C. to 60° C. were used, and aside from this, in case that an ion exchange and a reverse osmosis process were used, there was a necessity to worry about fouling, and the ammonia has been recovered in the form of ammonium sulphase, mono-ammonium phosphate (MAP), Di-ammonium phosphate (DAP), etc., the scope of its utilization has been limited only to fertilizer which is a low value-added product, and the conventional technologies are problematic in that since there is no process of removing carbon dioxide, or in order to carry out carbon dioxide stripping from the wastewater, air is used, discharge gas containing carbon dioxide increases.

Also, in case of the process of recovering the ammonia using the absorption method, the ammonia is recovered as low value-added ammonia water, and in the case of recovering the ammonia in a gas phase through absorption, there is a limit that its concentration is low.

Thus, as a result of the present inventors' steady efforts for researches concerning a method of recovering ammonia in high purity from wastewater, the present invention has been accomplished in such a manner as to perform ammonia stripping at high efficiency through a decompression type reactor with respect to raw water resulting from gathering high concentration wastewater and removing a solid therefrom, and to cause the stripped ammonia to be highly purified in a gas phase without phase change by a separation membrane process of causing the stripped ammonia to pass through a gas separation membrane, thereby enabling it to be selectively recovered.

PRIOR ART DOCUMENT

Patent Document (Patent Document 1) Korean Patent No. 1804011 (grant-announced on Dec. 6, 2017)
(Patent Document 2) Korean Patent No. 1785505 (grant-announced on Oct. 17, 2017)
(Patent Document 3) Korean Patent Laid-Open Publication No. 2016-0117838 (published on Oct. 11, 2016)

SUMMARY OF THE INVENTION

An object of the present invention is to provide an ammonia stripping device using a decompression type reactor aimed for raw water resulting from gathering high concentration wastewater and removing a solid therefrom.

The other object of the present invention is to provide a resource recovery type high concentration wastewater treatment system capable of recovering ammonia stripped from the ammonia stripping device and by selectively purifying the ammonia through a polymeric gas separation membrane.

In order to accomplish the objects, the present invention may provide an ammonia stripping device comprising: a decompression type reactor configured to perform an ammonia stripping process under a condition of pressure being controlled with respect to raw water flowing in after pre-treatment from high concentration wastewater; a heat exchanger configured to cause ammonia flowing in from the decompression type reactor to pass through a heat-radiating path; a cooler configured to supply water to the heat-radiating path to maintain a fixed temperature of the heat exchanger; a trap configured to recover water condensed from the heat exchanger; and a stripped gas collector configured to recover ammonia passing through the trap.

In accordance with an exemplary embodiment of the present invention, high concentration wastewater may be applied into anyone selected from a group consisting of anaerobic digestion outflow water of sewage sludge, an anaerobic digestive fluid of sewage sludge, livestock night soils in slurry type comprising pig liquid or cattle slurry, a digestive liquid of livestock night soils, and a co-digestion supernatant of swine manure and food.

It may be preferable that during the stripping process using decompression, pH ranges from 8.8 to 11, and a basic material for maintaining the pHs may be put additionally so that the concentration can be adjusted.

The decompression type reactor may carry out consecutive operations under the condition of pressure of 0.5 bar to 2 bar, and may be optimized under the condition of a temperature of 35° C. to 60° C.

Also, an ultrasonic generator may be attached into the decompression type reactor and may carry out vacuum stripping, or vacuum and ultrasonic stripping together, thereby enhancing the efficiency of stripping.

Also, the present invention may provide a resource recovery type high concentration wastewater treatment system, which carried out: an ammonia stripping process of performing vacuum stripping, or a combination of vacuum and ultrasonic stripping through the ammonia stripping device; a separation membrane process of causing an ammonia mixed gas recovered by the stripping process to pass through polymeric gas separation membrane; and a process for producing resources from a high concentration of ammonia selectively recovered by the separation membrane process.

With respect to the resource recovery type high concentration wastewater treatment system according to the present invention, the ammonia stripping process may be a separation process in low energy form of removing ammonia by additionally attaching a vacuum stripping machine or an ultrasonic generator into the decompression type reactor, thereby performing vacuum stripping and ultrasonic stripping together.

Also, the resource recovery type high concentration wastewater treatment system according to the present invention may consecutively carry out the separation membrane process of causing the ammonia mixed gas recovered by the stripping process to pass through the highly polymerized separation membrane.

The polymeric gas separation membrane may be a non-porous high polymer membrane through which gas permeates in such a manner that the gas melts from the surface of a polymer and diffuses through free volume of the polymer, and particularly, the polymeric gas separation membrane may carry out the separation process of showing excellent selectivity intended for a mixed gas of $NH_3/N_2$.

Preferably, a material consisting of a perfluorinated sulfonic acid polymer, or a polyimide-based (polyamide-imides and co-polyimide) polymer may be used in the polymeric gas separation membrane, and the polymeric gas separation membrane may be a flat membrane or a hollow fiber membrane and may be provided in a membrane module consisting of the flat membrane or the hollow fiber membrane.

Preferably, the polymeric gas separation membrane may be a hollow fiber membrane made of a polyimide-based (polyamide-imides and co-polyimide) polymer, and the hollow fiber membrane may have an external diameter of 400 μm to 500 μm, and a membrane thickness of 70 μm to 100 μm.

Furthermore, the separation membrane process of improving thermal stability of the hollow fiber membrane through chemical crosslinking may be carried out.

With respect to the resource recovery type high concentration wastewater treatment system according to the present invention, the separation membrane process shows that the ammonia mixed gas recovered by the stripping process flows into the polymeric gas separation membrane through a pressure control step, and that an ammonia gas selectively permeating through the polymeric gas separation membrane is recovered or collected at high purity by passing through a step of constituent analysis step after the pressure control step and a flow measurement step.

Also, the ammonia mixed gas recovered by the stripping process may flow into the polymeric gas separation membrane through the pressure control step, and remaining gas may be disused by passing a pressure measurement step, a back pressure regulation step, and a flow measurement step and may go through an ammonia neutralization step just before being disused.

The ammonia stripping device according to the present invention can remove ammonia from high concentration wastewater at high stripping efficiency by carrying out vacuum stripping, or vacuum and ultrasonic stripping together within the decompression type reactor, thereby carrying out a separation process in low energy form that there is no necessity to separately put chemicals to maintain the conventional air-blowing step and high pHs.

Also, the resource recovery type high concentration wastewater treatment system can cause an ammonia mixed gas recovered by the ammonia stripping device to highly purify selectively in an ammonia gas phase without phase change through a separation membrane process of causing the ammonia mixed gas to pass through the polymeric gas separation membrane, thereby recovering the ammonia of high purity.

Through the resource recovery type high concentration wastewater treatment system, from high concentration wastewater, such as anaerobic digestion outflow water of sewage sludge, an anaerobic digestive fluid of sewage sludge, livestock night soils in slurry type comprising pig liquid or cattle slurry, a digestive liquid of livestock night soils, a co-digestion supernatant of swine manure and food, and so on, ammonia can be recovered at a more than 90% recovery rate and in the state of high purity of 99% purity, thereby being reused in resources.

DETAILED DESCRIPTION OF THE INVENTION

Hereinafter, the present invention is described in detail.

Figure 1:
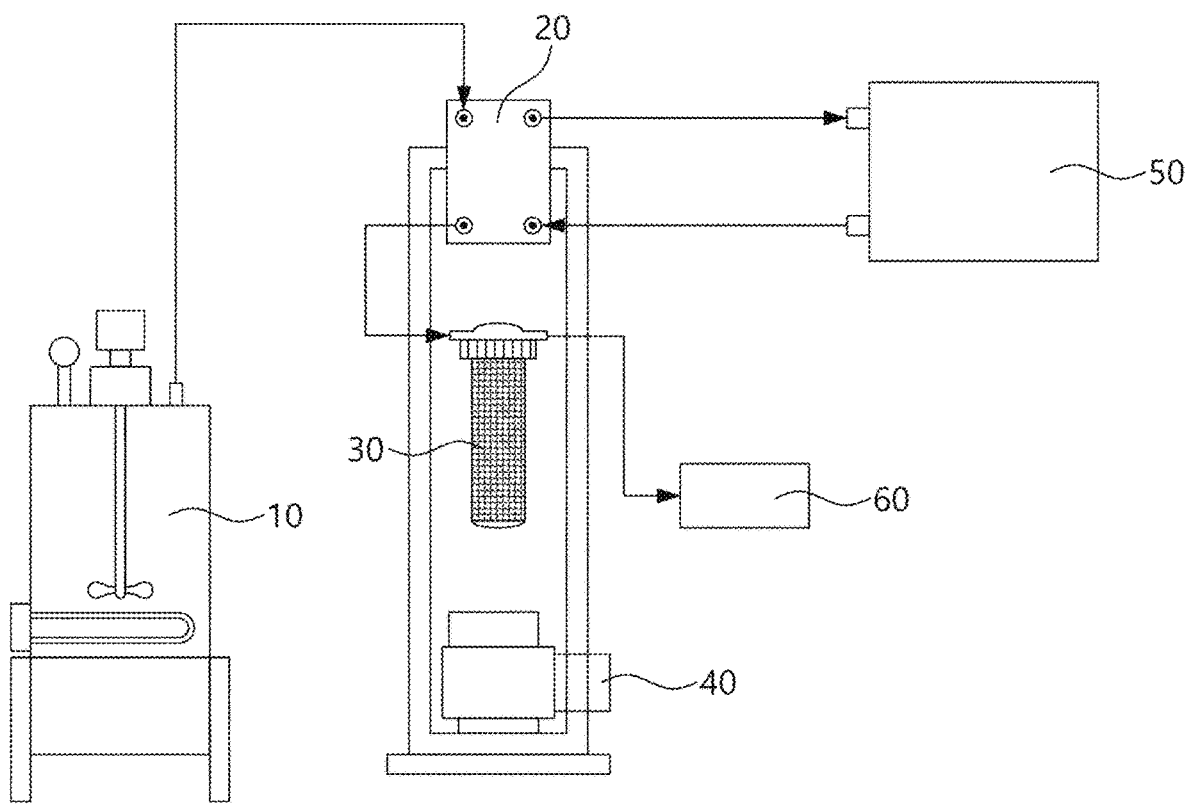
FIG. 1 is a schematic diagram showing an ammonia stripping device according to the present invention.

FIG. 1, which is a schematic diagram showing an ammonia stripping device according to the present invention, provides the ammonia stripping device comprising: a decompression type reactor 10 configured to carry out an ammonia stripping process under a condition that the pressure of raw water obtained after pretreatment from high concentration wastewater is controlled; a heat exchanger 20 configured to cause ammonia flowing in from the decompression type reactor to pass through a heat-radiating path; a cooler 50 configured to supply water to the heat-radiating path to maintain a fixed temperature of the heat exchanger; a trap 30 configured to recover water condensed from the heat exchanger 20; and a stripped gas collector 60 configured to recover ammonia passing through the trap. The ammonia stripping device further comprises a vacuum pump 40, which guides the ammonia gas, which has vaporized in the decompression reactor 10, to pass sequentially through the heat exchanger 20 and the steam trap 30.

The high concentration wastewater according to the present invention is any one selected from a group consisting of: anaerobic digestion outflow water of sewage sludge; an anaerobic digestive fluid of sewage sludge; livestock night soils in slurry type comprising pig liquid or cattle slurry; a digestive liquid of livestock night soils; and a co-digestion supernatant of swine manure and food, and raw water resulting from gathering the wastewater and removing a solid therefrom is used. At this time, since it is meant that as the concentration of ammonia in the solid increases gradually, the concentration of recoverable ammonia is rich, according to an exemplary embodiment of the present invention, each concentration of 3,500 mg/L of TN, 2,500 mg/L of NH4+-N, 300 mg/L of TP, 100 mg/L of PO43--P is limited and described, but should not be construed as being limited thereto.

Also, with respect to the ammonia stripping process using the decompression type reactor, in case that pH is uniformly maintained during a decompression stripping process, reaction time required for stripping decreases more and more, or the final concentration of ammonia may be maintained to be lower. At this time, it is preferable that the pH during the stripping process using decompression ranges from 8.8 to 11, and in order to maintain high concentration, the concentration may be adjusted in such a manner as to additionally put any one basic material selected from a group consisting of NaOH, CaO, and $Ca(OH)_2$.

The conventional ammonia stripping method is to remove an ammonium ion ($NH_4^+$) in the state of gas by converting it to ammonia ($NH_3$) under the condition that pHs of wastewater are more than 11, and at this time, in order to raise the pHs, calcium hydroxide and sodium hydroxide are mainly used, and a method of simultaneously removing phosphorous ingredients is used through the condensation and precipitation of phosphorus. However, although the conventional ammonia stripping method is advantageous in that a recovery rate of nitrogen is high because ammonia is removed in such a manner as to perform stripping after causing most of the ammonia to exist in a gaseous state by setting up the condition of high pHs, it is problematic in that there is a necessity for performing air-blowing for a long time in order to make excessively saturated ammonia discharged in the air, a high temperature and a high pH condition are required, and a chemical material intended for making pH maintained is required in an excess of quantity.

On the contrary, the ammonia stripping device using the decompression type reactor according to the present invention carries out consecutive operations under a fixed condition of decompression with respect to the raw water flowing in, so an ammonia stripping phenomenon and a decrease in pH scale may be confirmed.

At this time, with respect to an execution condition required for the decompression type reactor according to the present invention, because of having an effect on ammonia stripping according to each condition of changes in pH, temperature, and pressure is secured, the pH, temperature, and pressure conditions are optimized, so the decompression type reactor may be driven at low energy.

With respect to the preferable decompression condition, decompression is performed under a condition of 0.5 bar to 2 bar, and according to another exemplary embodiment of the present invention, the result of occurrence of the ammonia stripping phenomenon and a decrease in pH scale is presented under the fixed condition of 1 bar, but the condition of pressure is not limited to that shown in this exemplary embodiment.

Also, under the pressure condition, pH ranges from 8.8 to 11, and more preferably, in case that decompression is performed under the condition that pH ranges from 9.5 to 10, may be confirmed a result which shows that the reaction time decreases, and the concentration of ammonia reduces as well up to a 90% to 95% level in comparison with its early concentration of 2,500 mg/L. Currently, when the condition of pH shows that pHs exceed 11, the reaction time reduces according to an increase in pH scale, but the effect of a rise in efficiency of ammonia removal is insignificant, so the condition is inefficient in comparison with expenses for maintaining high pH.

Also, a preferable condition of temperature is 35° C. to 60° C., and more preferably, 35° C. to 50° C. Although the efficiency of ammonia removal increases as the temperature increases gradually, when the temperature exceeds 60° C., the effect of a rise in efficiency of ammonia removal is insignificant in comparison with expenses required for raising the temperature of the reactor.

In order to enhance the efficiency of ammonia stripping, the ammonia stripping device according to the present invention may carry out vacuum stripping and ultrasonic stripping together as an ultrasonic generator is attached into the decompression type reactor.

When an ultrasonic wave is emitted, by electrical oscillation, to the raw water flowing in after pretreatment from the high concentration wastewater, the moment it decreases from high tension to low tension, bubbles occur, and upon a decrease in tension to low tension, the bubbles grow, and when the bubbles are formed and grow, ammonia gas is included into the bubbles. Since the bubbles instantaneously occurring in large quantities due to this electrical oscillation of the ultrasonic wave are removed using a vacuum stripping device, the efficiency of stripping may be improved.

Since 20 kHz or more of a sound wave is generated from the ultrasonic generator so that a stripping process is carried out by mechanical vibration, efficiency of the vacuum stripping device may increase.

Figure 2:
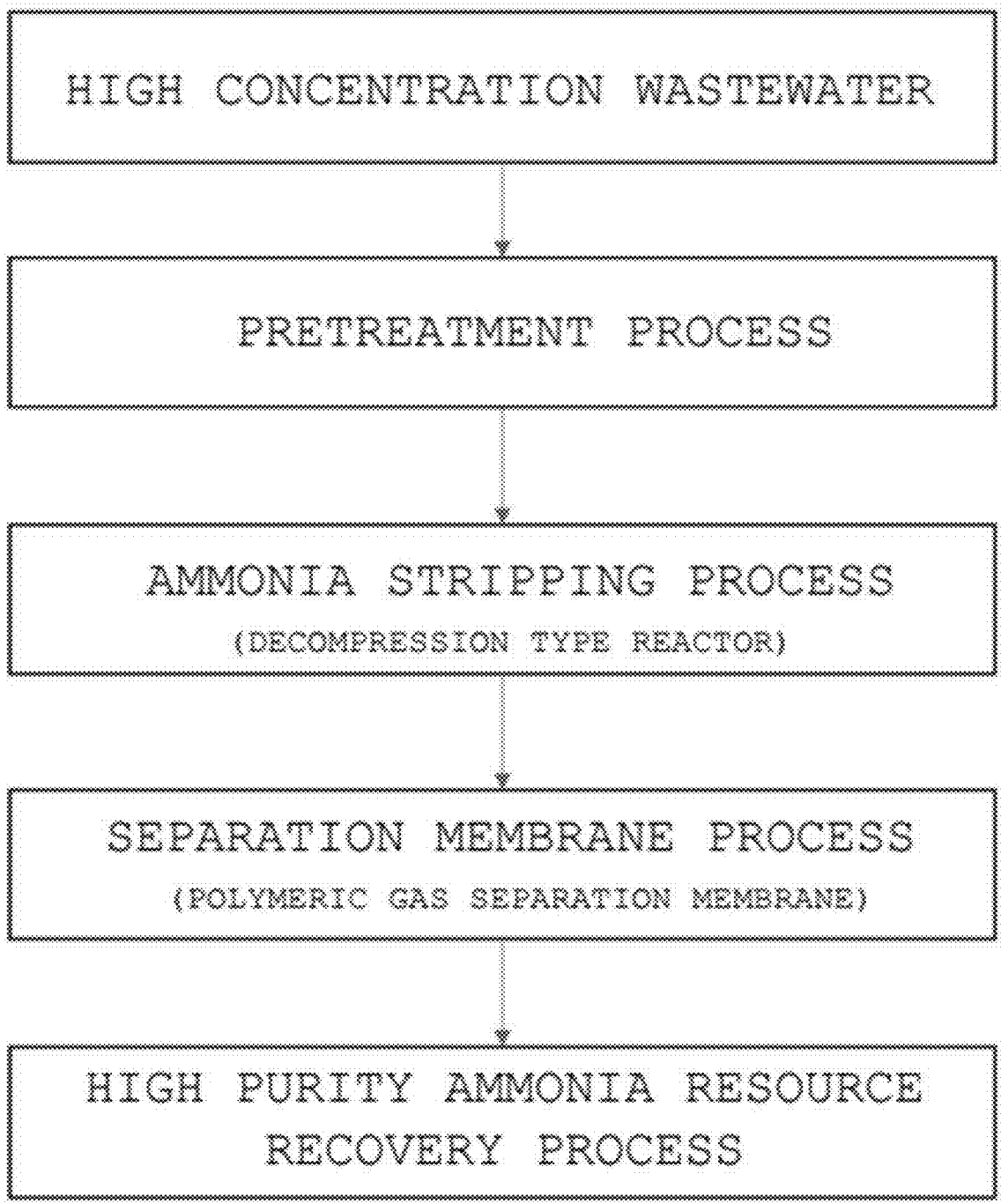
FIG. 2 illustrates the process flow of a resource recovery type high concentration wastewater treatment system according to the present invention.

FIG. 2, which illustrates the process flow of a resource recovery type high concentration wastewater treatment system according to the present invention, provides the resource recovery type high concentration wastewater treatment system which performs: an ammonia stripping process of performing vacuum stripping, or vacuum and ultrasonic stripping together with respect to raw water resulting from gathering high concentration wastewater and removing a solid therefrom; a separation membrane process of causing the stripped-down ammonia to pass through polymeric gas separation membrane; and a process of making the ammonia of high concentration selectively recovered by the separation member process into resources.

The resource recovery type high concentration wastewater treatment system according to the present invention may carry out a pretreatment process, such as screening, condensation and/or precipitation, aerated grit, floating, electrolysis, etc. after gathering high concentration wastewater and removing a solid therefrom, and a well-known process required for pretreatment may be applied.

After said pretreatment, the resource recovery type high concentration wastewater treatment system according to the present invention carries out the ammonia stripping process of removing ammonia from the raw water using the decompression type reactor.

The conventional ammonia stripping method is to remove an ammonium ion ($NH_4^+$) in the state of gas by converting it to ammonia ($NH_3$) under the condition that pHs of wastewater are more than 11, and at this time, in order to raise the pHs, calcium hydroxide and sodium hydroxide are mainly used, and a method of simultaneously removing phosphorous ingredients is used through the condensation and precipitation of phosphorus. However, although the conventional ammonia stripping method is advantageous in that a recovery rate of nitrogen is high because ammonia is removed in such a manner as to perform stripping after causing most of the ammonia to exist in a gaseous state by setting up the condition of high pHs, it is problematic in that there is a necessity for performing air-blowing for a long time in order to make excessively saturated ammonia discharged in the air, a high temperature and a high pH condition are required, and a chemical material intended for making pH maintained is required in an excess of quantity.

On the contrary, the ammonia stripping device using the decompression type reactor according to the present invention carries out consecutive operations under a fixed condition of decompression with respect to the raw water flowing in, so an ammonia stripping phenomenon and a decrease in pH scale may be confirmed.

On the contrary, the ammonia stripping device using the decompression type reactor according to the present invention carries out consecutive operations under a fixed condition of decompression with respect to raw water flowing in, so an ammonia stripping phenomenon and a decrease in pH scale may be confirmed.

Also, since the ultrasonic generator is attached into the decompression type reactor from any location within the decompression type reactor, vacuum stripping and ultrasonic stripping are carried out together, so the efficiency of stripping can enhance.

The resource recovery type high concentration wastewater treatment system according to the present invention carries out the separation membrane process of causing the ammonia mixed gas recovered by the stripping process to pass through the polymeric gas separation membrane.

The polymeric gas separation membrane is a nonporous, high polymer membrane through which gas penetrates in such a manner as to cause the gas to be soluble from the surface of a polymer and to diffuse through free volume, and currently, gas permeability is calculated in such a manner as to multiply a solubility value by a diffusion coefficient according to a solution-diffusion model.

Figure 3:
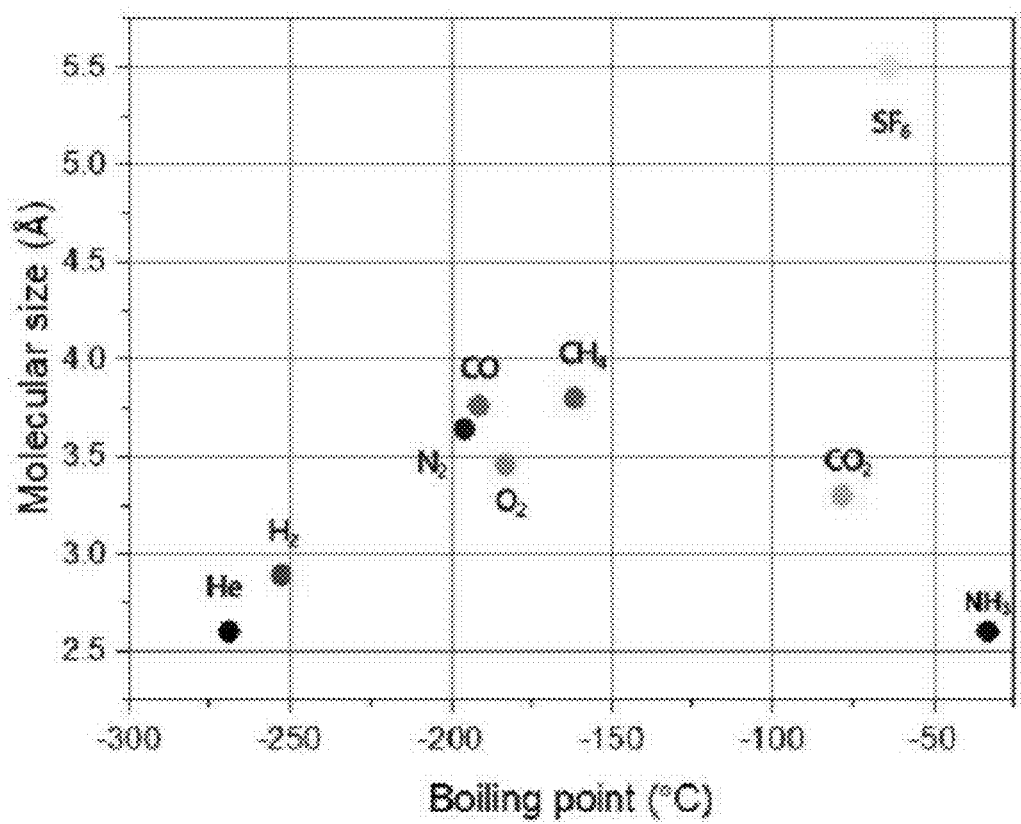
FIG. 3 illustrates physical properties of the main gas to be separated in the resource recovery type high concentration wastewater treatment system according to the present invention.

Referring to FIG. 3, which illustrates the physical properties of the main gases to be separated in the resource recovery type high concentration wastewater treatment system according to the present invention, it is expected that permeation selectivity will be high because a difference in solubility and a difference in molecular size (diffusivity) are large in case of $NH_3/O_2$ and $NH_3/N_2$. Accordingly, the polymeric gas separation membrane according to the present invention is a high permeation selectivity separation membrane showing excellent selectivity aimed for the mixed gas of $NH_3/N_2$.

The highly polymerized separation membrane having a separation property with respect to $NH_3/O_2$ or $NH_3/N_2$ (occupying the greatest specific gravity), $NH_3/CO_2$ (showing a small difference in solubility), and $NH_3/He$ or $NH_3/H_2$ (showing a small difference in diffusivity) is selected in consideration of the solubility of a solvent, workability, the easiness of synthesis, and so on, and it is preferable that a perfluorinated sulfonic acid polymer material, or a polyimide-based (polyamide-imides and co-polyimide) polymer material is used.

The perfluorinated sulfonic acid polymer has stability physically and/or chemically because a main chain is fluorinated and has high $NH_3$ permeability thanks to high affinity of a sulfonic acid group of a side chain, and $NH_3$.

Also, the polyimide-based (polyamide-imides and co-polyimide) polymer is advantageous in that a chemically resistant property is high, a heat-resisting property, is excellent, and a possibility to induce various types of chemical structure, and the possibility of reforming is high.

Figure 4:
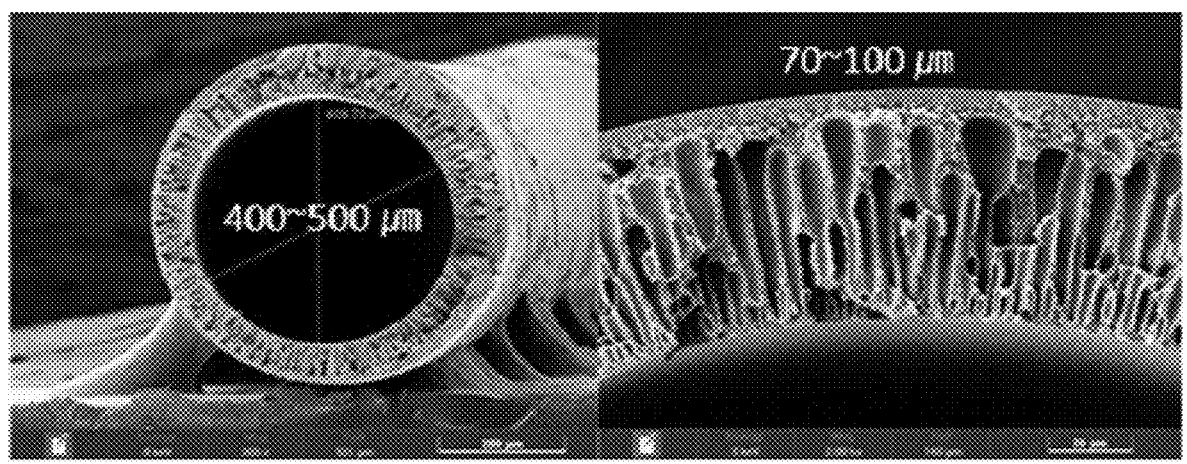
FIG. 4 is a photograph by a scanning electron microscope (SEM) from polymeric gas separation membrane used in a separation membrane process of the resource recovery type high concentration wastewater treatment system according to the present invention.

FIG. 4 shows, as a preferable exemplary embodiment of the highly polymerized separation membrane used in the separation membrane process of the resource recovery type high concentration wastewater treatment system according to the present invention, a photograph result captured by a scanning electron microscope (SEM) concerning the section and thickness of a polyimide hollow fiber membrane, wherein the hollow fiber membrane has an external diameter of 400 μm to 500 μm, and a membrane thickness of 70 μm to 100 μm.

As the thickness of the separation membrane material gets thin as a thin film, ammonia permeability may be maximized.

Also, the polymeric gas separation membrane is able to be applied into a flat membrane or a hollow fiber membrane and is provided in a membrane module consisting of the flat membrane or the hollow fiber membrane.

Figure 5:
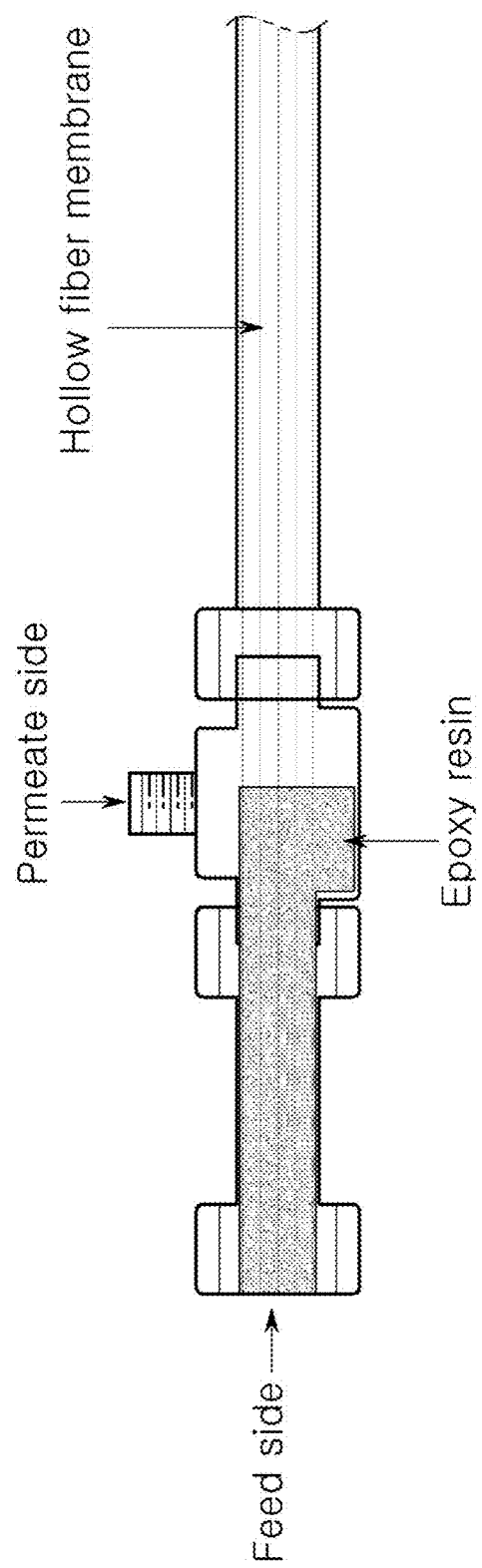
FIG. 5 illustrates a membrane module process for a polyimide hollow fiber membrane shown in FIG. 4.

FIG. 5 illustrates a process for the membrane module of the polyimide hollow fiber membrane shown in FIG. 4, the membrane is produced in the form of the hollow fiber membrane and is then modulated and used in a tube type, so the module of the hollow fiber membrane may have an effective area per unit volume in comparison with flat membrane type-modules, and are more preferable because a process combination and the easiness of operation are excellent.

Also, with respect to the polyimide hollow fiber membrane having thermal stability at temperature ranges which reach 200° C. so as to resist severe circumstances until reaching the process of recovering high concentration, as a result of performing a dry process after crosslinking by soaking it in a crosslinking agent (p-xylenediamine) for 10 minutes, since remarkable thermal stability was confirmed, performance of the membrane may be improved by a stable crosslinking reaction.

Figure 6:
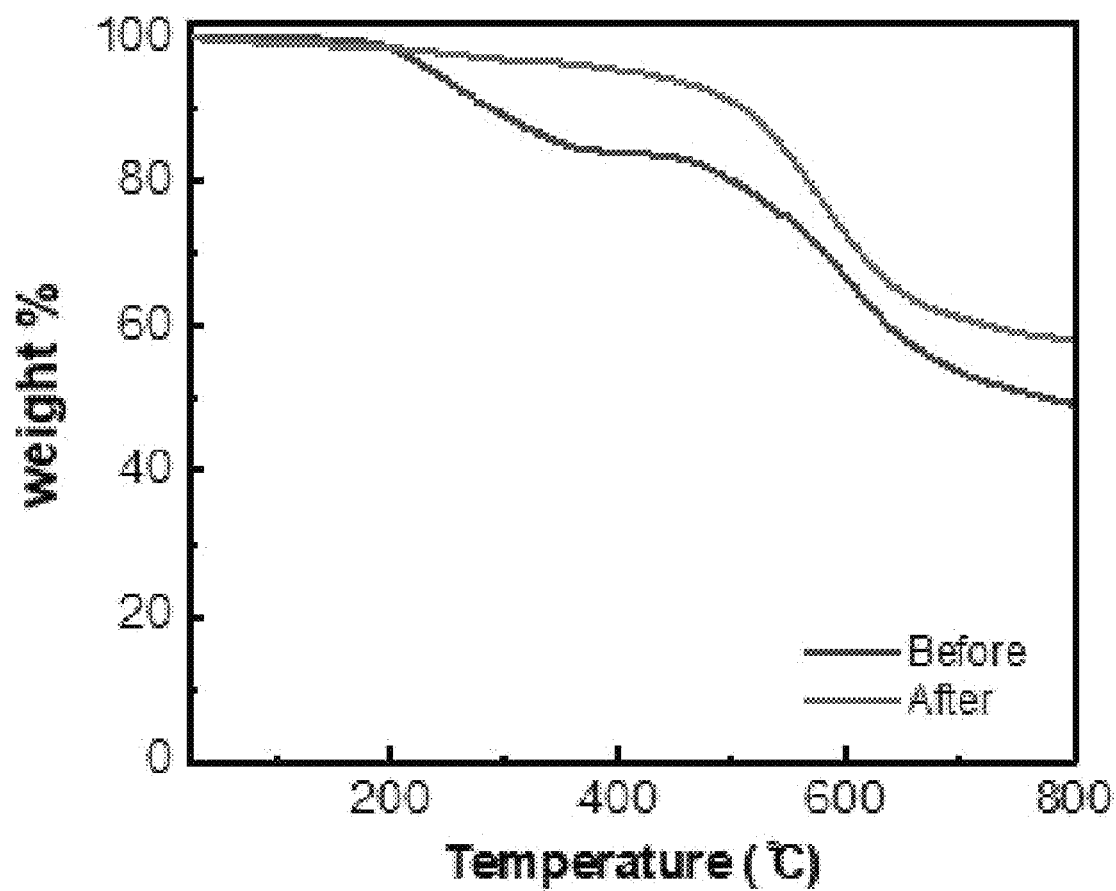
FIG. 6 shows a result of thermal analysis before and after crosslinking of the membrane modified by a chemical crosslinking reaction to the polyimide hollow fiber membrane of FIG. 5.

FIG. 6 shows a result of thermal analysis before and after crosslinking of the membrane modified by a chemical crosslinking reaction with respect to the polyimide hollow fiber membrane, and thermal stability compared with that shown before crosslinking may be confirmed.

Figure 7:
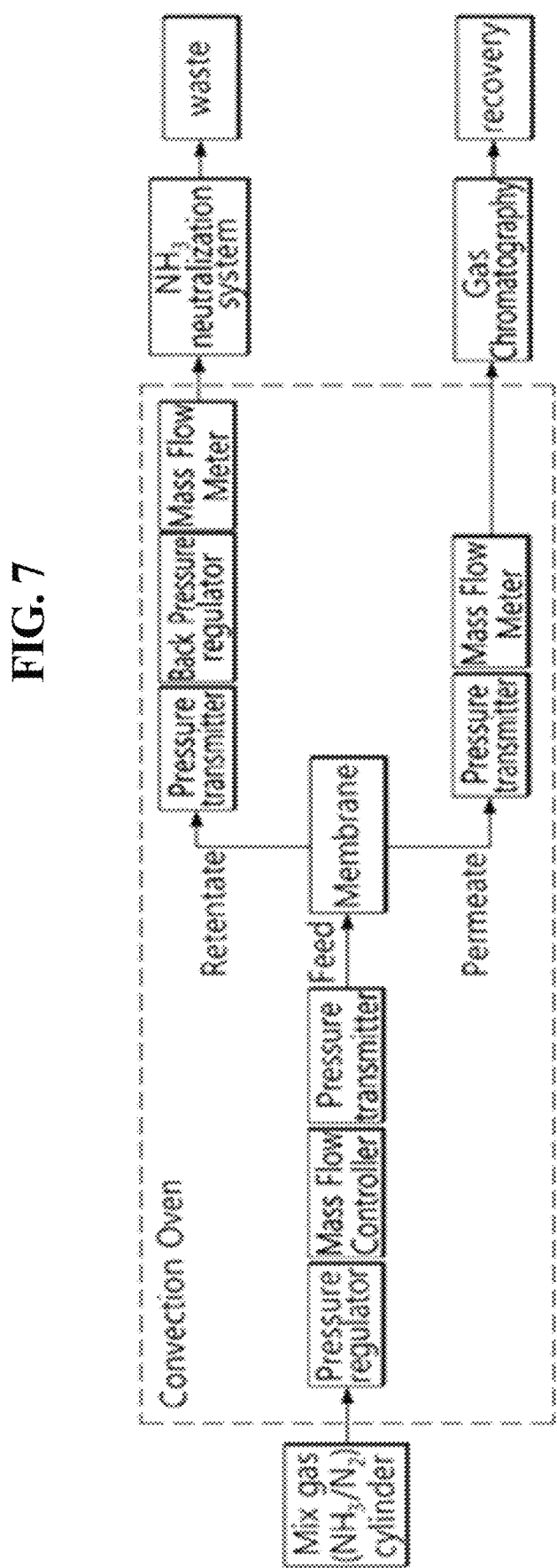
FIG. 7 is a flow chart of the separation membrane process with respect to the resource recovery type high concentration wastewater treatment system according to the present invention.

FIG. 7, which is a flow chart of the separation membrane process with respect to the resource recovery type high concentration wastewater treatment system according to the present invention, represents that the ammonia mixed gas recovered by the stripping process flows into the polymeric gas separation membrane through a step of controlling pressure, and the ammonia gas which selectively permeates through the polymeric gas membrane is recovered in a state of high purity by passing a step of analyzing ingredients after pressure adjustment and flow measurement steps.

Also, the ammonia mixed gas recovered by the stripping process flows into the polymeric gas separation membrane through a pressure control step, and gas remaining after passing through the highly gas separation membrane is disused by-passing pressure measurement, back pressure regulator (BPR), and flow measurement steps, and it is characteristic in that the gas is treated by an ammonia neutralization step just before its disuse.

With respect to the process of making the recovered ammonia into resources, which is carried out by the resource recovery type high concentration wastewater treatment system according to the present invention, the ammonia recovered by being made to highly purify selectively through the ammonia stripping process in low electric power and the separation membrane process of causing the ammonia-mixed to pass through the highly polymerized separation membrane as described above may be reused in the production of urea solutions, the raw materials of green hydrogen, power generation by ammonia-mixed fuel of coal-fired electrical power plants, and so on.

Hereinafter, the present invention is described in more detail with reference to examples.

These examples are intended for more specifically describing the present invention and should not be construed as limiting the scope of the present invention thereto.

1. Evaluation on Ammonia Stripping Process Using Decompression Type Reactor

Example 1

2 L of a specimen, anaerobic digestion outflow water of sewage sludge, gathered from a water regeneration center was prepared, and according to a process test method, the specimen was analyzed as showing that the concentration of TN was 7,800 to 10,700 mg/L, and the concentration of ammonia was 1,700 to 9,600 mg/L.

With respect to effluent to be stripped down, the early concentration of $NH_3$ was adjusted to 2,500 mg/L, and a decompression type reactor was used and operated under the condition that pH was set up to be 9.5 and temperature was set up to be 35° C. and 50° C. At this time, the operation was carried out in the state of a condition of decompression being fixed to the condition that gauge pressure was 1.0 bar.

A result of the concentration of $NH_3$—N and a change rate shown at each temperature depending on decompression time under the condition of a pH of 9.5 was described in Table 1 below. However, the following result was based on the fact that after the early pH was fixed to be 9.5, a decline in pH resulting from stripping wasn't adjusted artificially.

TABLE 1

Result of Operation of Decompression Type Reactor under Condition of pH of 9.5 (Pressure Being Fixed to 1 bar)

| Decompression Time (min) | pH of 9.5 | | | |
|---|---|---|---|---|
| | $NH_3$—N | | $C_1/C_0$ | |
| | 35° C. | 50° C. | 35° C. | 50° C. |
| 0 | 2,620 | 3,260 | 1.00 | 1.00 |
| 60 | 1,600 | 1,440 | 0.61 | 0.44 |
| 180 | 1,200 | 840 | 0.46 | 0.26 |
| 240 | 920 | 496 | 0.35 | 0.15 |
| 300 | 712 | 528 | 0.27 | 0.16 |

As the result of an experiment of the decompression type reactor under the condition that the pH was 9.5, in order to lead to a more than 50% decrease in comparison with the early concentration of ammonia, in case of 35° C., it took about 170 minutes, in case of 50° C., it took about 100 minutes, and the final concentration of ammonia within the decompression type reactor reduced up to about 73% and about 84% in comparison with its early concentration under the condition of each temperature of 35° C. and 50° C. when 300 minutes passed after the operation. That is, the high efficiency of ammonia stripping showed at 50° C.

Since the experimental values resulted from the fact that after the early pH was fixed to be 9.5, a decline in pH depending on stripping wasn't adjusted artificially, in case that pH is maintained uniformly during the stripping process using decompression, reaction time for stripping will be able to decrease, or the final concentration of ammonia will be able to be maintained to be lower.

Example 2

An experiment was carried out in the same manner as that shown in said Example 1 except the fact that a condition was changed to the condition of a pH of 10, and a result of the concentration of $NH_3$—N and a change rate shown at each temperature depending on decompression time under the condition of the pH of 10 was described in Table 2 below.

TABLE 2

Result of Operation of Decompression Type-Reactor under Condition of pH of 10 (Pressure Being Fixed to 1 bar)

| Decompression Time (min) | pH of 10 | | | |
|---|---|---|---|---|
| | $NH_3$—N | | $C_1/C_0$ | |
| | 35° C. | 50° C. | 35° C. | 50° C. |
| 0 | 2,550 | 2,800 | 1.00 | 1.00 |
| 60 | 1,580 | 1,320 | 0.62 | 0.47 |
| 180 | 750 | 700 | 0.29 | 0.25 |
| 240 | 296 | 188 | 0.12 | 0.07 |
| 300 | 156 | 74 | 0.06 | 0.03 |

As confirmed through Table 2 above, in case that the pH was 10, in order to lead to a more than 50% decrease in comparison with the early concentration of ammonia, under the temperature condition of 35° C., it took about 75 minutes, and under the temperature condition of 50° C., it took about 60 minutes, and under the condition of each temperature when 300 minutes passed after the operation, the final concentration of ammonia within the decompression type reactor reduced up to about 94% (at 35° C.) and about 97% (50° C.) in comparison with its early concentration. Through a stripping test performed under the condition of the pH of 10, the excellent efficiency of stripping was also confirmed under the temperature condition of 50° C.

As confirmed through Table 2 above, in spite of the fact that no pH was artificially adjusted during the reaction time under the condition of the pH of 10, was confirmed the result in which the final concentration of the ammonia was 156 mg/L and 74 mg/L under the condition of each temperature of 35° C. and 50° C., thereby reducing up to about 94% and about 97% in comparison with its early concentration.

Example 3

An experiment was carried out in the same manner as that shown in said Example 1 except the fact that a condition was changed to the condition of a pH of 11.5, and a result of the concentration of $NH_3$—N and a change rate shown at each temperature depending on decompression time under the condition of the pH of 11.5 was described in Table 3 below.

TABLE 3

Result of Operation of Decompression Type-Reactor under Condition of pH of 11.5 (Pressure Being Fixed to 1 bar)

| Decompression Time (min) | pH of 11.5 | | | |
|---|---|---|---|---|
| | $NH_3$—N | | $C_1/C_0$ | |
| | 35° C. | 50° C. | 35° C. | 50° C. |
| 0 | 2,340 | 2,250 | 1.00 | 1.00 |
| 60 | 1,490 | 1,350 | 0.64 | 0.60 |
| 180 | 730 | 510 | 0.31 | 0.23 |
| 240 | 500 | 300 | 0.21 | 0.13 |
| 300 | 310 | 125 | 0.13 | 0.06 |
| 360 | 160 | 85 | 0.07 | 0.04 |

As confirmed through Table 3 above, in case that the pH was 11.5, in order to lead to a more than 50% decrease in comparison with the early concentration of ammonia, under the condition of the temperature of 35° C., it took about 100 minutes, and under the condition of the temperature of 50° C., it took about 75 minutes, and under each temperature condition when 360 minutes passed after the operation, the final concentration of the ammonia within the decompression type reactor reduced up to about 93% (at 35° C.), and 96% (at 50° C.) in comparison with its early concentration.

That is, unlike the results shown under the conditions of each pH of 9.5 and 10, since ammonia stripping efficiencies resulting from each temperature were accomplished to be similar to each other, in case of the pH of more than 10.0, it was confirmed that the effect of a decrease in reaction time or a rise in removal efficiency resulting from an increase in pH was insignificant.

Also, under the condition of the pH of more than 10, after the reaction time of 300 minutes passed, the concentration of ammonia reduced up to a 90% to 95% level in comparison with its early concentration of 2,500 mg/L.

Based on this result of the experiment, since it was confirmed that the ammonia concentration reduced in spite of the fact that after each early pH was set up to be 9.5, 10, and 11.5, no additional chemicals for maintaining the fixed pHs were put during the reaction time, if the fixed pH conditions are maintained, the reaction time and the final ammonia concentration will be able to reduce.

However, after an amount of ammonia intended for recovery is set up, under temperature and/or time conditions, since the concentration of ammonia gas can reduce, there will be no need to put chemicals for maintaining the fixed pHs, and this is useful to low energy and the recovery of resources for a decrease in greenhouse gas emissions.

<Experimental Example 1> Evaluation on Factor of Operation of Decompression Type Reactor The concentration of ammonia and the efficiency of ammonia removal depending on each pH and temperature within the decompression type reactor were measured and described as shown in Table 4 below, and a result according to each condition of decompression was described in Table 5 below.

TABLE 4

Evaluation on Ammonia Concentration and Efficiency of Ammonia Removal According to Each pH and Temperature

| Condition of Experiment | | Concentration and Removal Efficiency of Ammonia | | | | |
|---|---|---|---|---|---|---|
| | | — | pH of 9.5 | pH of 10 | pH of 10.5 | pH of 11 |
| Temperature | — | 3,750 | 3,550 | 3,110 | 2,880 | 2,760 |
| | | (—) | (6%) | (17%) | (23%) | (27%) |
| | 25° C. | 3,340 | 3,200 | 3,140 | 2,830 | 2,460 |
| | | (3%) | (15%) | (16%) | (25%) | (35%) |
| | 50° C. | 2,820 | 2,680 | 2,130 | 1,680 | 1,330 |
| | | (25%) | (29%) | (43%) | (55%) | (65%) |
| | 80° C. | 2,710 | 2,670 | 1,950 | 1,360 | 800 |
| | | (28%) | (34%) | (48%) | (64%) | (79%) |

TABLE 5

Evaluation on Ammonia Concentration and Efficiency of Ammonia Removal according to Each Condition of Decompression

| No. | Condition of Experiment | pH | Temperature | Removal Rate of Ammonia (%) |
|---|---|---|---|---|
| 1 | Operation Stop of Pump | 9.5 | 35 | 16 |
| 2 | | 10 | 35 | 5 |
| 3 | | 10.3 | 35 | 17 |
| 4 | | 10.7 | 35 | 29 |
| 5 | Consecutive | 9.5 | 20 | 12 |

TABLE 5-continued

Evaluation on Ammonia Concentration and Efficiency of Ammonia Removal according to Each Condition of Decompression

| No. | Condition of Experiment | pH | Temperature | Removal Rate of Ammonia (%) |
|---|---|---|---|---|
| 6 | Operations of | 10 | 20 | 17 |
| 7 | Pump | 11.5 | 20 | 14 |
| 8 |  | 9.5 | 35 | 64 |

As confirmed through Table 5 above, as the result of an experiment concerning the operation stop of a pump, it was confirmed that the removal of the ammonia didn't reach even a 30% removal rate, whereas upon consecutive operations of the pump, the removal of the ammonia reached a 64% removal rate at its maximum. In the cases of No. 5 and No. 8, as the result, it was confirmed that even under the same conditions of pHs, the ammonia removal rates were largely affected by each temperature.

2. Evaluation on Separation Membrane Process Using Polymeric Gas Separation Membrane <Example 4> Production of Polyimide Hollow Fiber Membrane A dope solution was produced at a weight rate of 27 to 73 with a polyimide blend (Torlon, P84) and a solvent of NMP, and a hollow fiber membrane was produced using a phase transition phenomenon by a dry and/or wet method including a process of carrying out emission through a nozzle, and a phase separation at a coagulation bath. Washing and drying the solvent in a winding machine were performed, so modulation was performed.

<Experimental Example 2> Morphology of Polymeric Gas Separation Membrane

To observe structural characteristics of the polyimide hollow fiber membrane produced as mentioned above, photographing of its section using a scanning electron microscope (SEM) was performed, and the photograph was illustrated in FIG. 4. As a result thereof, it was confirmed that the external diameter and the internal diameter of the hollow fiber membrane were about 550 μm and about 400 μm, respectively, thickness of the membrane was about 70 μm to 80 μm. Also, as a result of observing the section of the separation membrane in 2,000 magnifications, a surface of the membrane had very thin and dense structure (a selective layer), and from the inside thereof, was observed finger structure formed when the solvent rapidly slipped out of the inside, so it was confirmed that the hollow fiber membrane was well produced.

<Experimental Example 3> Evaluation on Permeation Performance of Module of Polymeric Gas Separation Membrane In order to confirm separation performance of the gas separation membrane using a mixed gas of $NH_3/N_2$, the polyimide hollow fiber membrane produced as described above was modulated as presented in FIG. 5, a nafion hollow fiber membrane was modulated in such a manner as to gather several strands by one bundle, and thus each module of the hollow fiber membranes was composed of 34 cm effective long×20 strands, and 17 cm effective long×53 strands in a ½ inch seamless (SUS) tube.

Mixing gases used in a separation test for a mixed gas of $NH_3/N_2$ was ordered and used according to each concentration (mol % $NH_3$/mol % $N_2$ represents 10/90, 30/70, 50/50, 70/30, and 88/12).

Each pressure of the supply gases was adjusted by a regulator installed in a gas cylinder, and a permeable cell including the separation membrane was installed in a temperature chamber, so an operation temperature was regulated. A flow was adjusted by a mass flow controller (MFC), pressure shown from a retention side was adjusted by a back pressure regulator (BPR) to be maintained in the same manner as supply pressure, and gas which permeates through the separation membrane was sent for gas chromatography (GC) through a mass flow meter (MFM), so the flow and composition were analyzed. As a result, thereof, the result of use of the polyimide hollow fiber membrane was described in Table 6 below, and the result shown from the module of the nafion hollow fiber membrane was described in Table 7 below.

TABLE 6

Result of Ammonia Recovery Using Module of Polyimide Hollow Fiber Membrane

| Condition of Operation | | | | | | Result | | |
|---|---|---|---|---|---|---|---|---|
| | Supply | Permeation | Supply Composition | | Supply | Permeation Composition | Permeation | Factor of |
| Temp. (° C.) | Pressure (bar) | Pressure (bar) | $NH_3$ (mol %) | $N_2$ (mol %) | Flow ml/min | $NH_3$ (mol %) | Flow ml/min | Separation — |
| 25 | 6 | 1 | 10 | 90 | 100 | 63.3 | 3.4 | 15.5 |
|  | 4 | 1 | 50 | 50 | 50 | 95.8 | 15.9 | 22.7 |
|  | 4 | 1 | 50 | 50 | 200 | 99.0 | 80.9 | 99.0 |

TABLE 7

Result of Ammonia Separation Using Module of Nafion Hollow Fiber Membrane

| Condition of Operation | | | | | | Result | | |
| --- | --- | --- | --- | --- | --- | --- | --- | --- |
| Temp. (° C.) | Supply Pressure (bar) | Permeation Pressure (bar) | Supply Composition | | Supply Flow ml/min | Permeation Composition | Permeation Flow ml/min | Recovery Rate of $NH_3$ % |
| | | | $NH_3$ (mol %) | $N_2$ (mol %) | | $NH_3$ (mol %) | | |
| 25 | 6 | 1 | 10 | 90 | 100 | 84.4 | 3.8 | 31.7 |
| | 4 | 1 | 30 | 70 | | 99.0 | 22.5 | 74.1 |
| | 4 | 1 | 50 | 50 | | 99.3 | 40.9 | 81.3 |
| | 3 | 1 | 70 | 50 | | 99.7 | 61.7 | 88.0 |

Based on each result shown in Table 6 and Table 7 above, in case that each concentration of the ammonia contained in the mixing gases supplied was supplied to be 30 mol % or more, it was confirmed that each concentration of the ammonia which permeates through the polymeric gas membrane was 95 mol % or more, more preferably, 99 mol % or more, so its recovery was realized.

Also, since the flow rate resulting from permeation increased largely compared with the range of an increase in ammonia concentration of each supply gas, a recovery rate of the ammonia increased.

<Experimental Example 4> Evaluation on Stability of Module of Polymeric Gas Separation Membrane To evaluate thermal stability of the polyimide hollow fiber membrane, thermogravimetric (TGA) analysis was carried out, and in FIG. 6, was illustrated a result of the analysis on heat shown before and after crosslinking of the membrane modified by a chemical crosslinking reaction with respect to the polyimide hollow fiber membrane.

As its result, since it was confirmed that the polyimide hollow fiber membrane had thermal stability at temperature ranges which reached 200° C., whereas after crosslinking, it had thermal stability at temperature ranges which reached about 600° C., it was confirmed that performance of the membrane could be improved by the stable crosslinking reaction.

As previously described, although the present invention has been described in detail based on only the detailed exemplary embodiments and examples mentioned, it will be apparent to those having ordinary skill in the art that modifications and alternations can variously be made within the technical idea and the scope of the present invention, and it is to be natural that these modifications and alternations falls with the scope of the accompanying claims.

What is claimed is:

1. A method of recovering ammonia from wastewater, the method comprising:
    pretreating the wastewater to obtain raw water comprising an ammonia mixed gas;
    passing the raw water comprising the ammonia mixed gas to a decompression reactor to obtain a stream comprising stripped ammonia mixed gas wherein the decompression reactor is under a controlled pressure of about 0.5 to 2 bar gauge, a pH of about 9.5 to 10, a reaction temperature of about 20° C. to about 35° C., and consecutive operations of a pump;
    passing the stream comprising the stripped ammonia mixed gas through a heat exchanger to condense water wherein the heat exchanger has a heat-radiating path and is connected to a cooler that supplies water to the heat-radiating path to maintain a fixed temperature of the heat exchanger, passing the stripped ammonia mixed gas through a trap to recover condensed water, and then passing the stripped ammonia mixed gas to a stripped ammonia mixed gas collector; and
    passing the stripped ammonia mixed gas from the stripped ammonia mixed gas collector to a convection oven comprising a polymeric gas separation membrane wherein ammonia gas is selectively permeated, and the ammonia gas is passed through pressure adjustment, flow measurement and ingredients analysis steps to recover the ammonia gas having a purity of 99%.

2. The method according to claim 1, wherein the decompression reactor has an ultrasonic generator attached thereto.

3. The method according to claim 1, wherein the polymeric gas separation membrane is a hollow fiber membrane composed of a polyimide-based polymer having a dense structure on the surface of the membrane and a finger structure formed by rapid solvent escape on the inside.

4. The method according to claim 3, wherein the hollow fiber membrane is thermally stable by chemical crosslinking.

* * * * *